Aug. 9, 1955  W. BECKER  2,714,744
DEVICE FOR THE SHREDDING INTO FIBRES, AND HOMOGENIZATION, OF
MATERIAL, MORE PARTICULARLY ANIMAL SKIN MATERIAL, FOR
THE PRODUCTION OF SYNTHETIC SKINS BY
MEANS OF EXTRUDING NOZZLES

Filed Sept. 27, 1951  3 Sheets-Sheet 1

INVENTOR.
Walter Becker
BY
Michael S. Stone

Aug. 9, 1955  W. BECKER  2,714,744
DEVICE FOR THE SHREDDING INTO FIBRES, AND HOMOGENIZATION, OF
MATERIAL, MORE PARTICULARLY ANIMAL SKIN MATERIAL, FOR
THE PRODUCTION OF SYNTHETIC SKINS BY
MEANS OF EXTRUDING NOZZLES
Filed Sept. 27, 1951  3 Sheets-Sheet 2

INVENTOR.
Walter Becker
BY

United States Patent Office 2,714,744
Patented Aug. 9, 1955

2,714,744

DEVICE FOR THE SHREDDING INTO FIBRES, AND HOMOGENIZATION, OF MATERIAL, MORE PARTICULARLY ANIMAL SKIN MATERIAL, FOR THE PRODUCTION OF SYNTHETIC SKINS BY MEANS OF EXTRUDING NOZZLES

Walter Becker, Vaduz, Liechtenstein, assignor to Anstalt Unda, Vaduz, Liechtenstein Application September 27, 1951, Serial No. 248,588

Claims priority, application Switzerland September 27, 1950

6 Claims. (Cl. 18—14)

For the production of synthetic skins, especially from fibrous material of animal origin, it is necessary to break down the starting materials very thoroughly and carefully, and to convert them into a more or less pasty homogeneous mass which can be processed into thin-walled tubes or cases or the like by being extruded under pressure through fine, slit-aperture nozzles, such as annular-slit nozzles.

To allow for the possibility of the presence of impurities in the mass, especially when animal skin material is used, and also for the presence therein of minute particles which cannot, or can only with difficulty, be ground to small size, special precautions must be taken to ensure that these masses are freed from such undesired admixtures before they are extruded. Animal skin, which, even when preliminarily cleansed beforehand, contains impurities such as sand, wood splinters, and not infrequently even metal particles when delivered, also exhibits tiny nodules originating from keratinized areas of the epidermis, or lenticular parts, composed of microfibres, which, owing to their slippery nature, escape subdivision when the skin is converted into a paste. Complicated and time-wasting grinding processes are not sufficient to reduce these harmful occlusions to a harmless condition, with the result that, if they enter the extruding nozzles with the rest of the material for extrusion they later become detached in the finished synthetic skins and cause perforations and cracks.

With a view, in particular, to avoiding these nodules in the epidermis, which are so difficult to eliminate, it has in the past generally been preferred to detach the epidermis in its entirety after suitably preparing it with chemical agents. The removal of the epidermis constitutes, needless to say, a sometimes considerable loss of material. For this reason other methods have been sought, and in accordance with these methods the skin masses first finely ground, have been pressed through fine strainers. Apart from the necessity of employing high pressures for this purpose, and apart from the high rate of wear to which the equipment was subject, even these expedients did not succeed in completely and with certainty retaining these harmful particles, as under the high pressures they slip through or cause obstruction.

According to the present invention, in order to overcome these difficulties in the processing of the fibrous material from animal skin, it is proposed to insert in the path of the material to the extruding nozzle a device comprising at least two members functioning concentrically the one within the other, such as a cylindrical core and at least one cylindrical shell surrounding the said core, and also drive means for the generation of a relative motion in the peripheral direction, the mutually facing surfaces of the concentric members being provided with grooves which extend to the exterior at one end only, the two operating members defining, at least in that section not traversed by the grooves, an annular gap or slit the cross-section of which is not greater than that of the extruding nozzle used for the production of the desired synthetic skins.

The device may consist, for example, of two contra-rotating parts located at a distance the one from the other equal to the width of the gap or slit of the extruding nozzle, said parts comprising an inner hollow cylinder and an outer hollow cylinder the mutually facing surfaces of which are provided at uniform intervals with axially parallel grooves extending from one end face of said cylinders, said grooves being of equal width and equal depth and not extending over the full axial length, but leaving an annular section of shell on each of the said members, which annular sections of shell define a smooth-walled annular gap or slit which extends into the extruding nozzle contiguous thereto, the walls defining said annular gap or slit being separated by a radial distance which is less than the depth of the grooves.

Surprisingly enough, it is found that a pasty mass entering the grooves from the feed or supply end and penetrating between the contra-rotating members is excellently homogenized and that coarser particles thereof cannot pass through the annular gap until they have been ground fine.

It has been found particularly expedient, and especially in view of the aforementioned occlusions originating in the epidermis, to allow the members which are rotatably mounted the one within the other to contra-rotate without clearance and to provide the contact surfaces thereof with the aforementioned grooves which do not extend over the entire axial length of the said surfaces, and to form that annular section of the two opposing surfaces which is not traversed by the grooves with its surface recessed in relation to the contact surfaces of the two said contra-rotating parts, so that an annular gap is formed between the said members which is smaller than the slit of the extruding nozzle.

In order to facilitate the introduction of the mass it is also possible to provide the contra-rotating members, at the inlet ends of the grooves, with annular recesses, preferably in such a way as to produce, viewed in axial longitudinal section, tapered annular intake channels widening towards the exterior. The material entering this annular space, the cross-sectional area of which space decreases towards the grooves, enters the grooves under normal feed pressure, for instance the pressure provided by a feed-screw, is forced towards in the grooves, and is pushed forward by the relative motion between the core and the outer shell, each provided with similar grooves, is kneaded and rolled in the grooves, is shredded into fibres by the interaction of the edges of the grooves, and is only able to emerge from the grooves through the forward annular gap when it has been shredded to the requisite fineness. It has been found that in this way even the fine nodules are shredded into their microfibres and can now pass into the annular gap without causing any dislocation, it being possible, incidentally, for the said annular gap either to serve simultaneously as an extruding nozzle or to merge into such a nozzle. The said annular-slit nozzle may be an ordinary extruding nozzle with members in mutually contrary movement, that is to say, a core and a shell moved relatively to one another, or it may be a nozzle with a stationary core.

Such an arrangement affords the particular advantage that through the clearance-free arrangement of the members the inner part takes on an extremely tenuous lubricating film but cannot vibrate eccentrically, and again that, as a hollow cylinder, accommodates without play the stationary or rotating core, actually a contiguous extruding nozzle. In this way the harmful eccentric movements between the core and the outer shell in parts moved relatively to one another are avoided, a phenomeon which, if it occurs, results in the cross-section of the tubular product exhibiting variations of thickness and in consequence diminished durability.

An arrangement in accordance with the present invention, with the core and the shell mounted without clearance therebetween, therefore also affords an excellent bearing for annular-slit nozzles or the components thereof, or a bearing between parts moved relatively to one another which at the same time serve for the grinding and homogenization of pasty masses.

The accompanying drawing is intended to serve for the more detailed exposition of the foregoing remarks and of the manner in which the invention is used in practice for the purposes specified.

Figure 1:
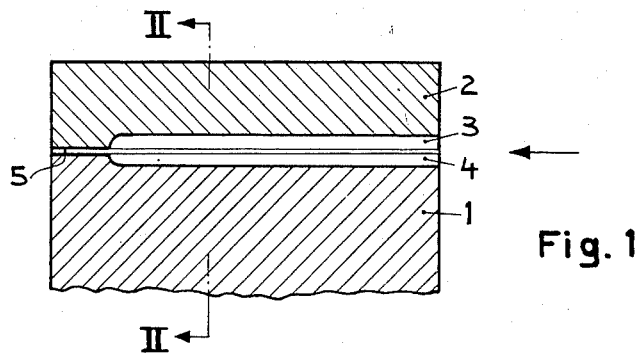
Fig. 1 shows dtiagrammatically, in a longitudinal section taken along the axis, the two cylindrical working members which are moved relatively the one to the other in the pheripheral direction.
Figure 2:
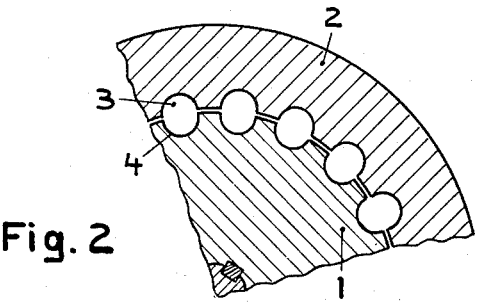
Fig. 2 is a fragmentary cross-section taken along II—II of Fig. 1.

The numeral 1 designates a hollow cylinder keyed or splined to a shaft, not shown, as the operating shaft, relatively to which hollow cylinder 1 the hollow cylinder 2 moves. The two cylinders are provided on their mutually facing surfaces with axially parallel grooves 3 and 4, of semicircular cross-section, which are spaced equal distances apart and may taper forward to a decreased cross-section and, proceeding from one end face, are not continued to the other end face, so that there is left between the two working members an annular gap, not traversed by grooves, of a length equivalent to the remainder of the length of the shell and a width determined by the radial clearance between the two working members. The mass enters the grooves in the direction indicated by the arrow and penetrates between the two working members, and cannot emerge from therebetween until it has been shredded to a degree of fineness appropriate to the annular gap 5.

Figure 3:
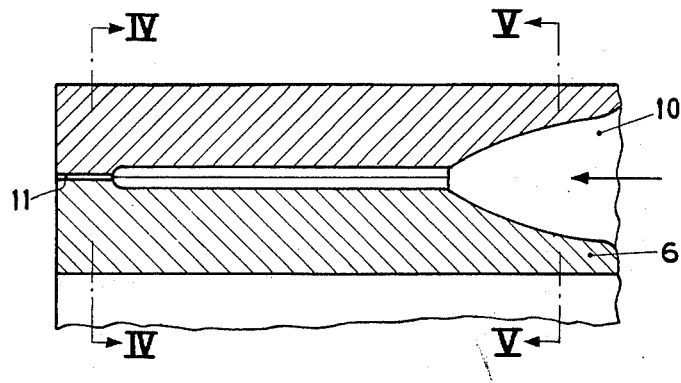
Fig. 3 shows, in a similar manner of presentation to Fig. 1, an alternative embodiment of the two contrarotating members.
Figure 4:
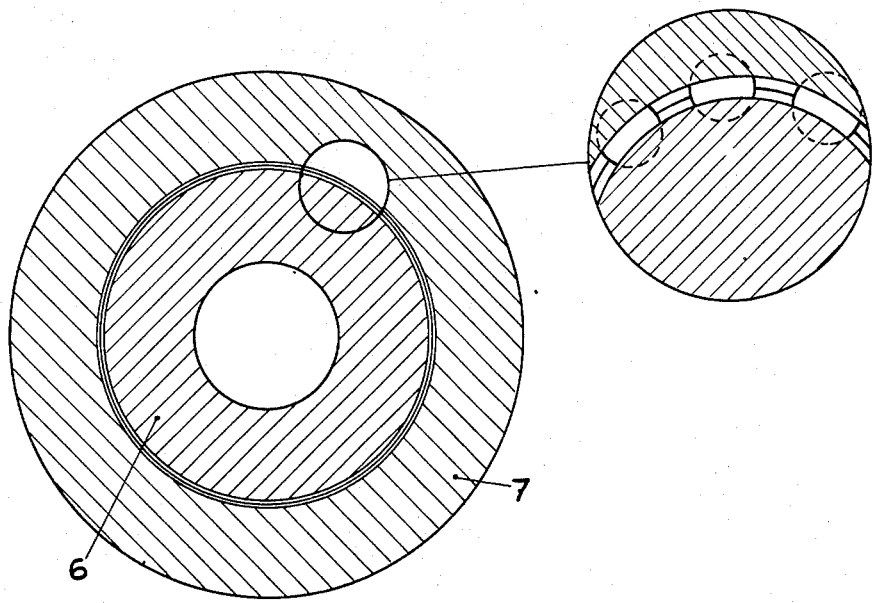
Fig. 4 is a section along IV—IV of Fig. 3 with a detail detached and enlarged.
Figure 5:
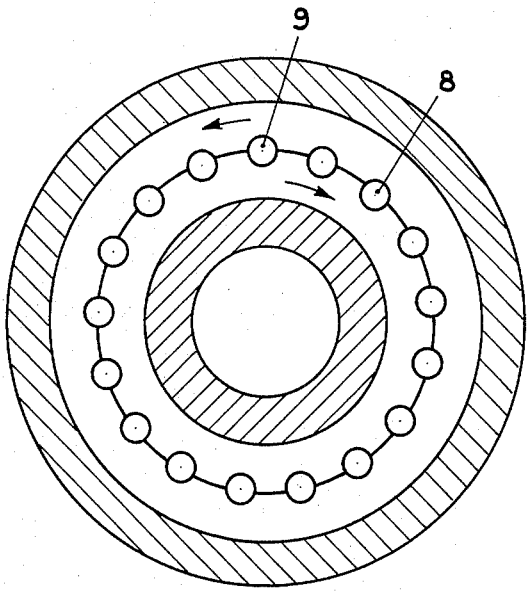
Fig. 5 is a cross-section along V—V in Fig. 3, on an enlarged scale.

Such an arrangement may be mounted immediataely behind an annular-slit nozzle and coaxial therewith, and if desired such an arrangement as is described below may be inserted before the same in order to increase the degree of shredding gradually. According to Figs. 3 to 5 the hollow cylinder 6, which may likewise be keyed or splined onto a working shaft, is mounted without clearance in the hollow cylinder 7. Both cylinders are provided on their mutually facing surfaces with axially parallel grooves 8, 9 which extend towards the inlet end, indicated by an arrow, into an annular space 10 tapered to a cross-section which increases in towards the exterior, and emerge at the other end face into an annular gap 11.

Figure 6:
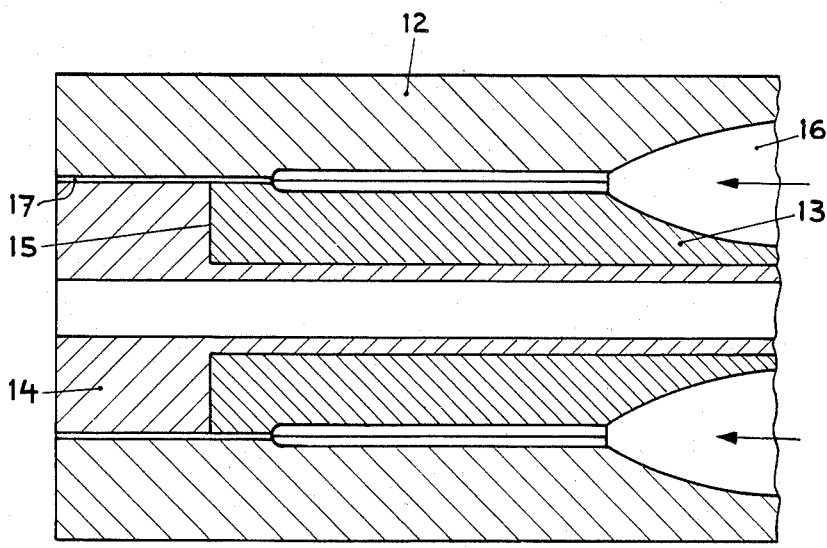
Fig. 6 is an embodiment of the device with an extruding nozzle.

According to Fig. 6, the cylinder 12 constitutes the outer shell of an extruding nozzle, which shell is, for example, stationary and in which the cylinder 13 is mounted for rotary movement, said cylinder 13 being in turn rigidly or rotatably mounted on the hollow shaft 14. A labyrinth packing at 15 which it may be necessary to provide for the purposes of rotatable mounting, and other bearing arrangements between the fixed core and its shaft, are not represented in the drawing.

According to Fig. 6 the pasty mass enters the annular space 16 in the direction of the arrow, possibly fed by a helical feeder and in a suitably ground condition, passes from here into the grooves and thence, suitably ground and homogenized, into the gap between the members 12 and 13 moved relatively to one another, said gap merging into the nozzle slot proper 17 for extrusion purposes.

What I claim is:

1. Apparatus for forming a pasty material into a homogeneous film while simultaneously filtering from the material particles larger than a predetermined size, comprising, in combination, an inner cylinder having an outer surface formed with a plurality of first, straight, mutually spaced grooves having sharp side edges, being distributed about the cylinder and extending only part way along the length of said cylinder parallel to the axis thereof; an outer cylinder coaxial with said inner cylinder, located closely about the same, and having an inner surface formed with a plurality of mutually spaced, second, straight grooves having sharp side edges, having distributed about said inner surface, extending only part way along the length of said outer cylinder parallel to the axis thereof and being located opposite said first grooves; and drive means connected to at least one of said cylinders for rotating the latter with respect to the other of said cylinders, so that when said one cylinder rotates about its axis with respect to said other cylinder, a pasty mass forced along the length of said grooves will form between said inner surface of said outer cylinder and said outer surface of said inner cylinder a homogeneous film having no particles larger than the thickness of the film.

2. Apparatus for forming a pasty material into a homogeneous film while simultaneously filtering from the material particles larger than a predetermined size, comprising, in combination, an inner cylinder having an outer surface formed with a plurality of first, straight, mutually spaced grooves of semicircular cross section having sharp side edges, being evenly distributed about the cylinder and extending only part way along the length of said cylinder parallel to the axis thereof; an outer cylinder coaxial with said inner cylinder, located closely about the same, and having an inner surface formed with a plurality of mutually spaced, second, straight grooves of semicircular cross section equal in number to said plurality of first grooves, also having sharp side edges, being evenly distributed about said inner surface, extending only part way along the length of said outer cylinder parallel to the axis thereof and being located opposite said first grooves; and drive means connected to at least one of said cylinders for rotating the latter with respect to the other of said cylinders, so that when said one cylinder rotates about its axis with respect to said other cylinder, a pasty mass forced along the length of said grooves will have particles therein cut by said edges and will form between said inner surface of said outer cylinder and said outer surface of said inner cylinder a homogeneous film having no particles larger than the thickness of the film, said first and second grooves becoming gradually smaller in a direction extending from one end of said cylinders to the opposite end thereof.

3. An apparatus for forming a pasty material into a homogeneous film while simultaneously filtering from the material particles larger than a predetermined size, comprising, in combination, an inner cylinder having an outer surface formed intermediate the ends of said cylinder with a plurality of first, straight, mutually spaced grooves having sharp side edges, being distributed about the cylinder and extending parallel to the axis thereof, said inner cylinder being formed at one end thereof with an annular cutout extending from said one end of said inner cylinder to said outer surface thereof and communicating with said first grooves; and an outer cylinder coaxial with said inner cylinder, located closely about the same, and having an inner surface formed intermediate the ends of said outer cylinder with a plurality of mutually spaced, second, straight grooves having sharp side edges, being distributed about said inner surface of said outer cylinder, extending parallel to the axis thereof and located opposite said first grooves, said outer cylinder having one end located about said one end of said inner cylinder and said outer cylinder being formed with an annular cutout extending from said one end of said outer cylinder to said inner surface thereof, communicating with said second grooves, and being located about and facing said annular cutout of said inner cylinder; and drive means connected to at least one of said cylinders for rotating the latter with respect to the other of said cylinders, so that when said one cylinder rotates about its axis with respect to said other cylinder, a pasty mass forced from said one ends of said cylinders along the length of said grooves will have particles therein cut mass forced from said one end of said cylinders along by said edges and will form beyond said grooves and between said grooves and between said inner surface of said outer cylinder and said outer surface of said inner cylinder a homogeneous cylindrical film having no particles larger than the thickness of the film.

4. Apparatus for forming a pasty material into a homogeneous film while simultaneously filtering from the material particles larger than a predetermined size, comprising, in combination, an inner cylinder having an outer surface formed with a plurality of first, straight, mutually spaced grooves having sharp side edges, being distributed about the cylinder and extending only part way along the length of said cylinder from one end thereof parallel to the axis thereof; an outer cylinder coaxial with said inner cylinder, located closely about the same with a predetermined clearance to form an annular gap between said cylinders, and having an inner surface formed with a plurality of mutually spaced, second, straight grooves having sharp side edges, being distributed about said inner surface, extending only part way along the length of said outer cylinder from one end thereof parallel to the axis thereof and being located opposite said first grooves; and drive means connected to at least one of said cylinders for rotating the latter with respect to the other of said cylinders, so that when one cylinder rotates about its axis with respect to the said other cylinder, a pasty mass forced from said one end of said cylinders along the length of said grooves will have particles therein cut by said edges and will form beyond said grooves in said gap between said inner surface of said outer cylinder and said outer surface of said inner cylinder a homogeneous cylindrical film having no particles larger than the thickness of the film.

5. Apparatus for forming a pasty material into a homogeneous film while simultaneously filtering from the material particles larger than a predetermined size, comprising, in combination, an inner cylinder having no intermediate outer surface portion formed with a plurality of first, straight, mutually spaced grooves having sharp side edges, being distributed about the cylinder and extending only part way along the length of said cylinder parallel to the axis thereof, said inner cylinder having next to said intermediate outer surface portion thereof an end portion having an outer surface of a smaller diameter than said intermediate outer surface portion of said inner cylinder; and an outer cylinder coaxial with said inner cylinder, located closely about the same, and having an intermediate inner surface portion coextensive with said intermediate outer surface portion of said inner cylinder, surrounding said intermediate outer surface with almost no clearance, being formed with a plurality of mutually spaced, second, straight grooves having sharp side edges, being distributed about said inner surface, extending only part way along the length of said outer cylinder parallel to the axis thereof and being located opposite said first grooves, said outer cylinder having next to said intermediate inner surface portion thereof an end portion located about said end portion of said inner cylinder and having an inner diameter larger than the diameter of said intermediate inner surface portion of said outer cylinder so as to form between said end portions of said inner and outer cylinders an annular gap larger than the clearance between said cylinders at said intermediate surface portions thereof; and drive means connected to at least one of said cylinders for rotating the latter with respect to the other of said cylinders, so that when said one cylinder rotates about its axis with respect to said other cylinder, a pasty mass forced toward said annular gap along the length of said grooves will have particles therein cut by said edges and will form between said inner surface of said outer cylinder and said outer surface of said inner cylinder at said intermediate portions thereof a lubricating film and in said annular gap a homogeneous cylindrical film having no particles larger than the thickness of the lubricating film.

6. Apparatus for forming a pasty material into a homogeneous film while simultaneously filtering from the material particles larger than a predetermined size, comprising, in combination, an inner cylinder having an outer surface formed with a plurality of first, straight, mutually spaced grooves distributed about the cylinder and extending only part way along the length of said cylinder parallel to the axis thereof; an outer cylinder coaxial with said inner cylinder, located closely about the same, and having an inner surface formed with a plurality of mutually spaced, second, straight grooves distributed about said inner surface, extending only part way along the length of said outer cylinder parallel to the axis thereof and being located opposite said first grooves, the clearance between said cylinders being smaller than the depth of the grooves; and drive means connected to at least one of said cylinders for rotating the latter with respect to the other of said cylinders, so that when said one cylinder rotates about its axis with respect to said other cylinder, a pasty mass forced along the length of said grooves will form between said inner surface of said outer cylinder and said outer surface of said inner cylinder a homogeneous film having no particles larger than the thickness of the film.

References Cited in the file of this patent

UNITED STATES PATENTS

| | | |
|---|---|---|
| 1,718,184 | Ostermann | June 18, 1929 |
| 1,807,773 | Dawson | June 3, 1931 |
| 2,161,908 | Becker | June 13, 1939 |
| 2,183,959 | Dunsheath | Dec. 19, 1939 |
| 2,345,086 | Becker et al. | Mar. 28, 1944 |
| 2,507,491 | Crea | May 16, 1950 |